United States Patent
Chan et al.

(10) Patent No.: US 10,949,372 B2
(45) Date of Patent: *Mar. 16, 2021

(54) SYSTEMS AND METHODS FOR DATA COMMUNICATION

(71) Applicant: THE BOEING COMPANY, Chicago, IL (US)

(72) Inventors: Eric Y. Chan, Mercer Island, WA (US); Henry B. Pang, Mercer Island, WA (US); Tuong Kien Truong, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,114

(22) Filed: Jan. 31, 2020

(65) Prior Publication Data

US 2020/0167305 A1 May 28, 2020

Related U.S. Application Data

(63) Continuation of application No. 13/896,430, filed on May 17, 2013, now Pat. No. 10,572,423.

(51) Int. Cl.
*G06F 13/40* (2006.01)
*H04B 1/00* (2006.01)
(Continued)

(52) U.S. Cl.
CPC ......... *G06F 13/40* (2013.01); *G02B 6/02033* (2013.01); *H04B 1/00* (2013.01);
(Continued)

(58) Field of Classification Search
CPC ........ H04B 10/00; H04B 10/278; G06F 13/40
See application file for complete search history.

(56) References Cited

U.S. PATENT DOCUMENTS

| 5,459,609 A | 10/1995 | Schrag |
| 5,901,203 A | 5/1999 | Morganstein et al. |

(Continued)

FOREIGN PATENT DOCUMENTS

| CN | 102106100 A | 6/2011 |
| GB | 2482381 A | 2/2012 |

(Continued)

OTHER PUBLICATIONS

Chan, E. et al; Application of COTS High Power Laser Diodes and Driver for Free Space Laser Communication Terminal; SPIE vol. 3266; pp. 54-67.

(Continued)

*Primary Examiner* — Tim T Vo
*Assistant Examiner* — Phong H Dang
(74) *Attorney, Agent, or Firm* — Armstrong Teasdale LLP

(57) ABSTRACT

A line replacement unit includes a terminal controller, and a plastic optical fiber serial interface module (POFSIM) coupled between the terminal controller and the data bus. The POFSIM is configured to transmit digital optical signals to the data bus based on electrical signals received from the terminal controller, and transmit electrical signals to the terminal controller based on digital optical signals received from the data bus.

20 Claims, 9 Drawing Sheets

(51) Int. Cl.
  *H04B 10/278* (2013.01)
  *G02B 6/02* (2006.01)
  *H04B 10/40* (2013.01)
  *G02B 6/42* (2006.01)

(52) U.S. Cl.
  CPC ........... *H04B 10/278* (2013.01); *H04B 10/40* (2013.01); *G02B 6/421* (2013.01); *G02B 6/4204* (2013.01); *G02B 6/4238* (2013.01); *G02B 6/4248* (2013.01); *G02B 6/4251* (2013.01); *G02B 6/4292* (2013.01)

(56) References Cited

U.S. PATENT DOCUMENTS

| | | | |
|---|---|---|---|
| 5,930,428 A * | 7/1999 | Irwin | G02B 6/4284 385/88 |
| 6,151,567 A | 11/2000 | Ames et al. | |
| 6,901,203 B1 * | 5/2005 | Czubarow | G02B 6/4248 385/138 |
| 10,572,423 B2 * | 2/2020 | Chan | H04B 1/00 |
| 2002/0076247 A1 | 6/2002 | Kelsay | |
| 2003/0006429 A1 | 1/2003 | Takahashi et al. | |
| 2007/0258722 A1 | 11/2007 | Yu | |
| 2010/0021174 A1 | 1/2010 | Truong | |
| 2011/0103802 A1 | 5/2011 | Chan | |
| 2011/0243566 A1 | 10/2011 | Truong | |
| 2012/0027415 A1 * | 2/2012 | Chan | H04B 10/504 398/115 |
| 2012/0305949 A1 | 12/2012 | Donofrio et al. | |
| 2012/0306351 A1 | 12/2012 | Wilcox et al. | |

FOREIGN PATENT DOCUMENTS

| | | |
|---|---|---|
| JP | H08274718 A | 10/1996 |
| JP | 2002344024 A | 11/2002 |
| JP | 2013510468 A | 3/2013 |
| WO | 2013036338 A1 | 3/2013 |

OTHER PUBLICATIONS

Extended European Search Report of application No. 14167897.9; dated Oct. 21, 2014; 7 pages.

Notification of First Office Action of Chinese Application No. 201410210406.2, dated Jun. 14, 2017, 13 pages.

JPO Office Action for related application 2014-093180 dated Apr. 3, 2018; 10 pp.

China Office Action for related application 2014102104062 dated May 3, 2018; 21 pp.

* cited by examiner

SYSTEMS AND METHODS FOR DATA COMMUNICATION

CROSS-REFERENCE TO RELATED APPLICATIONS

This application is a Continuation of U.S. patent application Ser. No. 13/896,430 filed May 17, 2013, now issued as U.S. Pat. No. 10,572,423, the contents of which are hereby incorporated herein by reference.

FIELD

The field of the disclosure relates generally to data communications and more specifically, to an optical fiber serial interface module that interfaces between a terminal controller and a data bus.

BACKGROUND

At least some known applications include an ARINC 629 data bus that uses metal twisted pair electrical bus cables, stub cables, bus terminators and current mode couplers (CMC) mounted on heavy metallic panels. However, because of such components, the data bus is bulky, heavy and expensive. Optical communications solutions, such as those that utilize optical fiber as a communications media, are desirable due to the reduced weight, which may be advantageous in an aircraft.

One existing solution for implementing an optical fiber data bus incorporates glass optical fibers (GOFs). This system utilizes 850 nm wavelength transmitters and receivers that are packaged individually in a pair, called a Fiber Optic Serial Interface Module (FOSIM). The FOSIM transmitter and receiver have interface electronics to the terminal controller which transmit and receive electrical signal to and from the FOSIM in Manchester bi-phase format. In the typical aircraft application, these FOSIMs are located inside the various avionics subsystems of the aircraft that utilize the data bus for communications. Often, such avionic subsystems are referred to as Line Replaceable Units (LRUs). Inside the LRU, the FOSIMs are mounted along with the terminal controller on a multilayer 6U (full size) VME circuit card.

However, GOFs may be relatively fragile and break relatively easily during installation on a vehicle, such as an airplane. Further, GOFs have a relatively small diameter, which may make optical alignment difficult. Therefore, components associated with GOFs, such as connectors and optoelectronic devices, may be relatively expensive. There is a strong desire in the aircraft production community to develop an optical data bus that uses more robust optical fiber, such as a plastic optical fiber data bus, to replace the current electrical ARINC 629 data bus for future upgrades of such aircraft, although implementations would not be limited to aircraft applications.

BRIEF DESCRIPTION

In one aspect, a data communication system is provided. The data communication system includes a data bus, and a line replacement unit including a terminal controller, and a plastic optical fiber serial interface module (POFSIM) coupled between the terminal controller and the data bus. The POFSIM is configured to transmit digital optical signals to the data bus based on electrical signals received from the terminal controller, and transmit electrical signals to the terminal controller based on digital optical signals received from the data bus.

In another aspect, a plastic optical fiber serial interface module (POFSIM) is provided. The POFSIM includes a terminal controller interface electronic circuit (TCIEC) configured to receive electrical signals from a terminal controller, an optical source coupled to the TCIEC and configured to transmit digital optical signals to a data bus based on the received electrical signals, and a detector coupled to the TCIEC and configured to receive digital optical signals from the data bus, wherein the TCIEC is further configured to transmit electrical signals to the terminal controller based on the received digital optical signals.

In yet another aspect, a method for use in communicating data between a terminal controller and a data bus is provided. The method includes receiving, at a plastic optical fiber serial interface module (POFSIM), an electrical signal from the terminal controller, generating, using the POFSIM, a digital optical signal based on the received electrical signal, and transmitting the digital optical signal to the data bus from the POFSIM.

The features, functions, and advantages that have been discussed can be achieved independently in various implementations or may be combined in yet other implementations, further details of which can be seen with reference to the following description and drawings.

DETAILED DESCRIPTION

The systems and methods described herein enable data communications between a terminal controller and a plastic optical fiber data bus. A plastic optical fiber serial interface module (POFSIM) interfaces between the terminal controller and the data bus. The POFSIM receives electrical signals from the terminal controller and transmits corresponding digital optical signals to the data bus. The POFSIM also receives digital optical signals from the data bus, and transmits corresponding electrical signals to the terminal controller.

Figure 1:
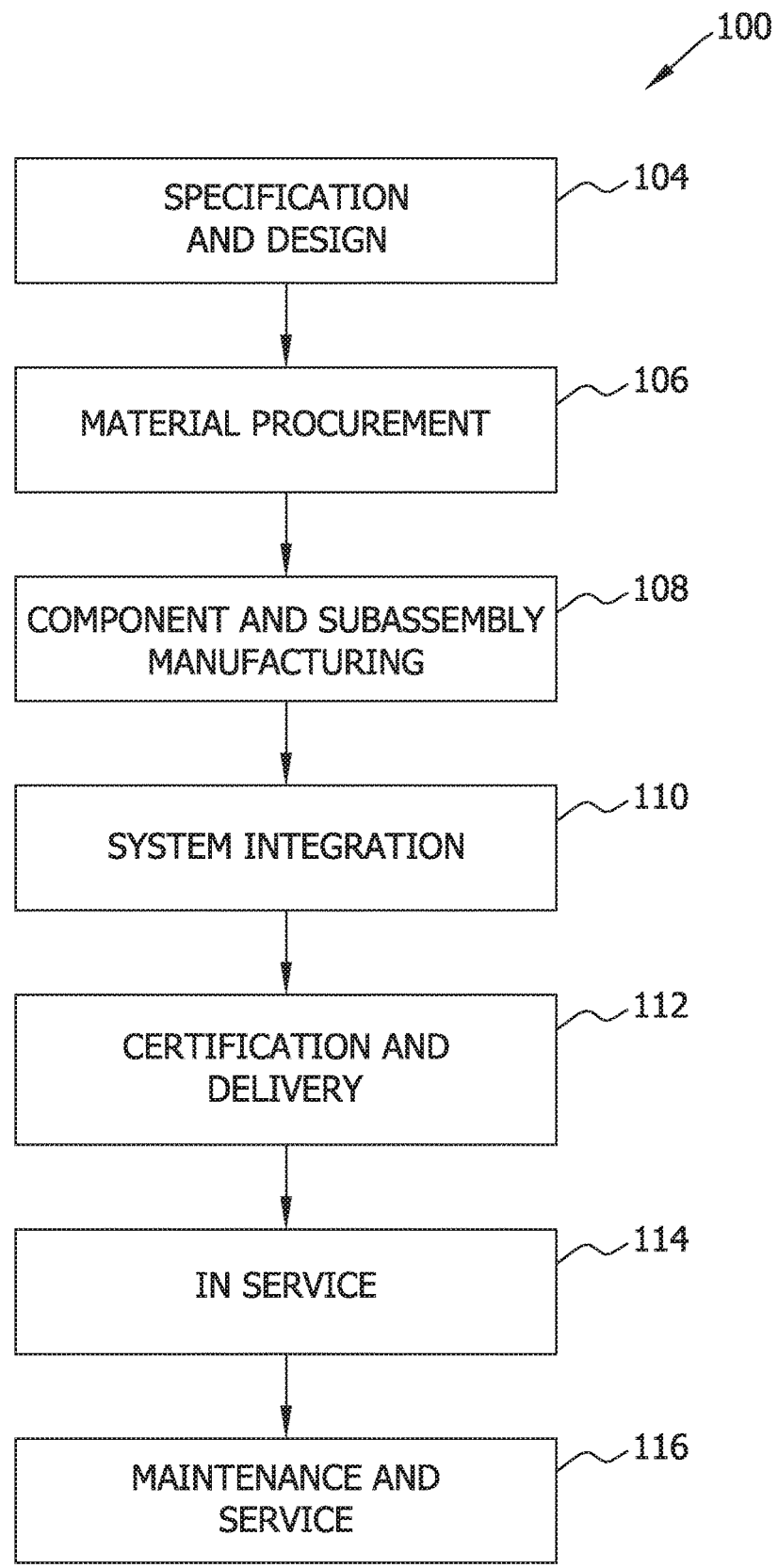
FIG. 1 is a flow diagram of aircraft production and service methodology.
Figure 2:
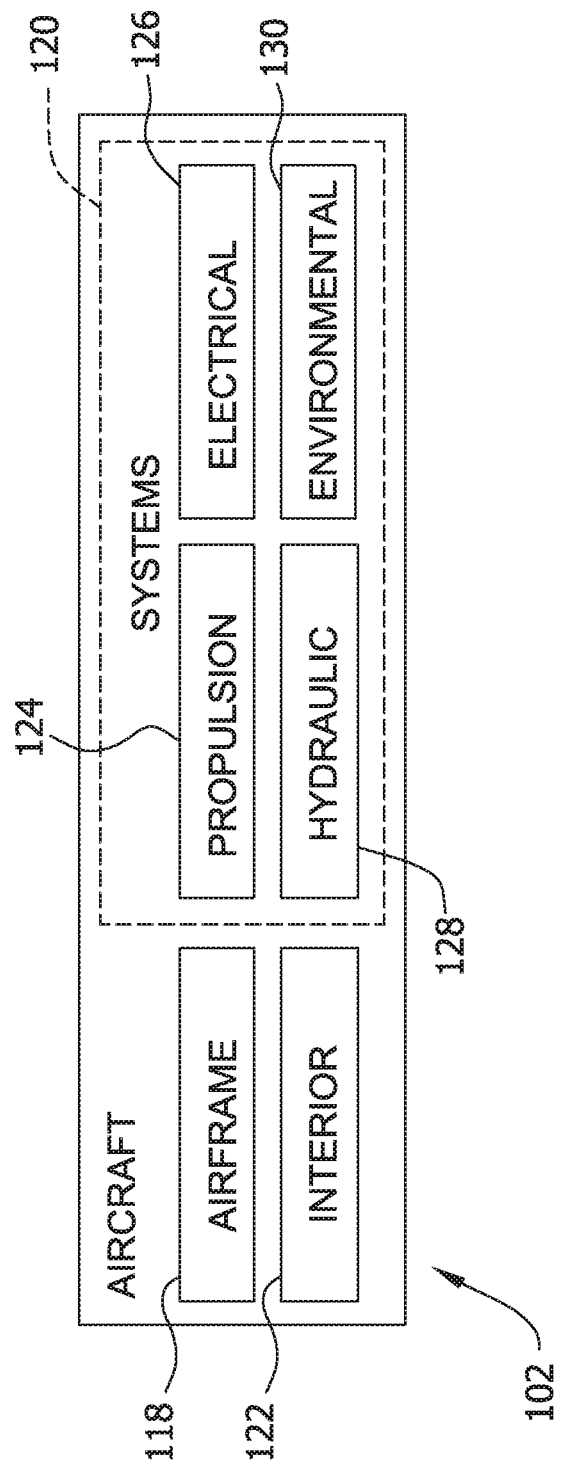
FIG. 2 is a block diagram of an aircraft.

Referring more particularly to the drawings, implementations of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods implemented herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116.

Figure 3:
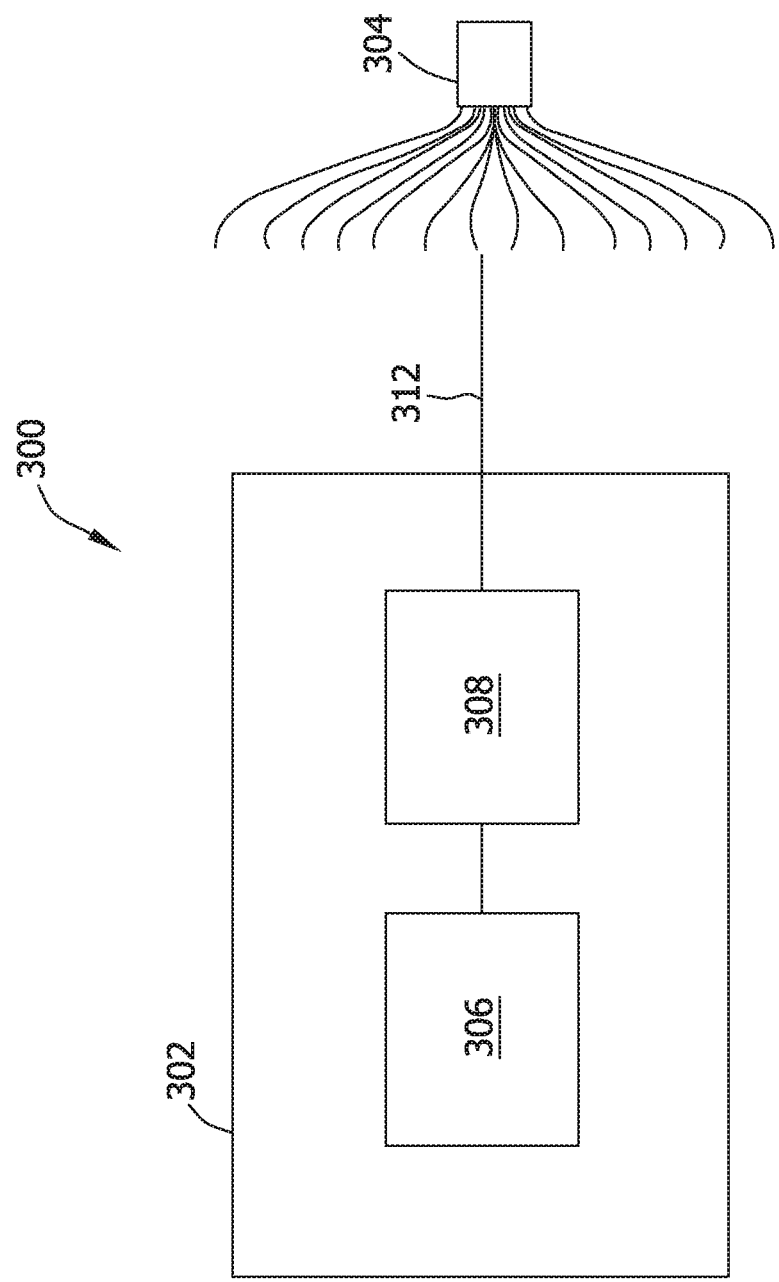
FIG. 3 is a block diagram of an exemplary data communication system.

FIG. 3 is a block diagram of an exemplary data communication system 300 that includes a line replacement unit (LRU) 302 communicatively coupled to a data bus 304. LRU 302 includes a terminal controller 306 communicatively coupled to a plastic optical fiber serial interface module (POFSIM) 308. LRU 302, and more specifically, POFSIM 308, is communicatively coupled to data bus 304 via at least one plastic optical fiber 312. In the exemplary implementation, data communication system 300 is implemented onboard a vehicle, such as an aircraft 102 (shown in FIG. 2). Alternatively, data communication system 300 may be implemented in any environment that enables data communication system 300 to function as described herein.

In the exemplary implementation, data bus 304 is a plastic optical fiber data bus, such as a plastic optical star coupler. Alternatively, data bus 304 is may be any type of data bus that enables data communication system 300 to function as described herein. POFSIM 308 functions as a communication interface between terminal controller 306 and data bus 304, as described herein. More specifically, POFSIM 308 receives electrical signals from terminal controller 306 and transmits corresponding optical signals to data bus 304. Further, POFSIM 308 receives optical signals from data bus 304 and transmits corresponding electrical signals to terminal controller 306. Notably, POFSIM 308 interfaces directly with data bus 304 and terminal controller 306, and no other processing devices or conversion units are required to facilitate communications between data bus 304 and terminal controller 306.

Figure 4A:
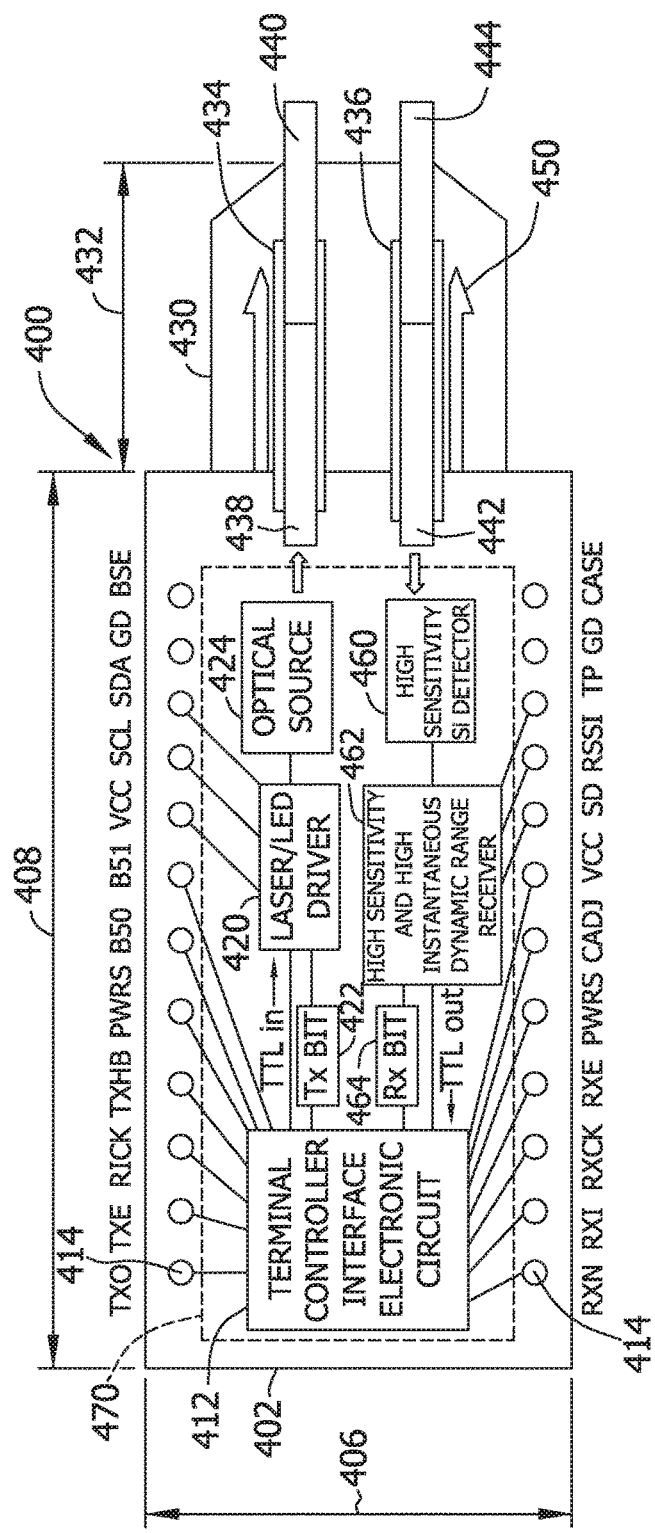
FIG. 4A is a schematic top view of an exemplary plastic optical fiber serial interface module (POFSIM) that may be used with data communication system shown in FIG. 3.
Figure 4B:
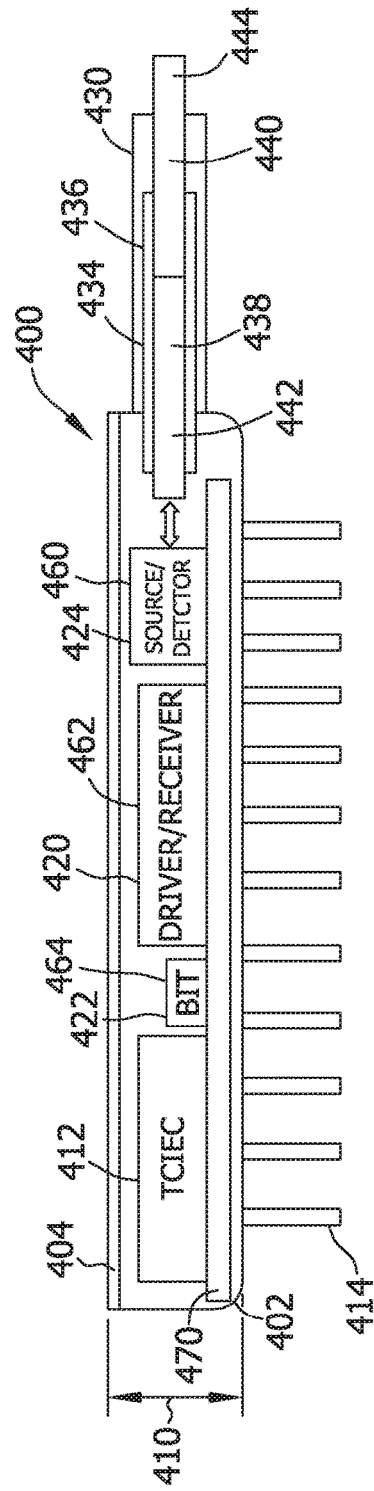
FIG. 4B is a schematic side view of the POFSIM shown in FIG. 4A.

FIG. 4A is a schematic top view of an exemplary POFSIM 400 that may be used with data communication system 300 (shown in FIG. 3). FIG. 4B is a schematic side view of POFSIM 400. To enable POFSIM 400 to be implemented in non-pressurized areas with high-reliability, components of POFSIM 400 are mounted in a bathtub-shaped package 402 that is hermetically sealed by a lid 404. POFSIM 400 is mounted inside an LRU, such as LRU 302 (shown in FIG. 3), and the LRU may be mounted inside an avionics chassis including multiple LRUs, limiting inter-board spacing. Accordingly, in the exemplary implementation, POFSIM 400 has a relatively low profile. For example, package 402 may have a width 406 of approximately 1.0 inch, a length 408 of approximately 2.0 inches, and a height 410 of approximately 0.25 inch. Alternatively, package 402 may have any dimensions that enable POFSIM 400 to function as described herein.

POFSIM 400 includes a terminal controller interface electronic circuit (TCIEC) 412 that interfaces with a terminal controller, such as terminal controller 306 (shown in FIG. 3). TCIEC 412 is coupled to at least a portion of a plurality of pins 414. The TXO, TXE, RICK, TXHB, PWRS, and VCC pins are inputs from the terminal controller for supplying power to POFSIM 400 and sending Manchester bi-phase electrical signals to POFSIM 400. More specifically, the TXO pin receives bi-phase Manchester encoded data in an ARINC 629 format from the terminal controller, the TXE pin is a driver enable input, the RICK pin is a 32 megahertz (MHz) clock signal, the TXHB pin is a driver controller active input, the PWRS pin is a power up reset input, and the VCC pin 414 is a power supply voltage input. Other pins 414 include a Bit 0 output (BS0) pin, a Bit 1 output (BS1) pin, a serial clock (SCL) pin, a serial data (SDA) pin, a ground (GD) pin tied to ground, a bite state enable (BSE) pin, 4 MHz receiver clock output (RXCK) pin, a receiver enable (RX) pin, a comparator adjust (CADJ) pin, a signal detect (SD) pin, a received signal strength indicator (RSSI) pin, a test point (TP) pin, and a package (CASE) pin tied to package 402. The SCL and SDA pins are used to externally program a light source driver (described below) by connecting to a serial interface port of an external computing device (not shown). The CADJ pin is used to adjust a comparator threshold inside TCIEC 412. The SD pin indicates whether a receiver (described below) is detecting an optical signal properly.

To communicate with a data bus, such as data bus 304, TCIEC 412 processes the timing of signals received from pins 414, and outputs a transistor-transistor logic (TTL) signal to a laser/light emitting diode (LED) driver 420. A transmitter (Tx) built-in-test (BIT) circuit 422 is coupled between TCIEC 412 and laser/LED driver 420. In response to receiving the TTL signal, laser/LED driver 420 outputs a drive current pulse to an optical source 424, which in turn emits a digital optical signal.

Tx BIT circuit 422 monitors the transmission TTL signal and operation of laser/LED driver 420 and optical source 424. In the exemplary implementation, Tx BIT circuit 422 monitors whether optical source 424 is erroneously trapped in on state (also referred to as "stuck on") or sporadically/randomly emitting digital optical signals (also referred to as "babbling"). If Tx BIT circuit 422 determines optical source 424 is stuck on or babbling, Tx BIT circuit 422 can inhibit the transmission of the TTL signal to prevent failure of data bus 304.

POFSIM 400 includes a mating connector 430 that extends from package 402. In the exemplary implementation, mating connector 430 has a length 432 of approximately 1.0 inches. Alternatively, mating connector 430 may have any dimensions that enable POFSIM 400 to function as described herein. Mating connector 430 includes a transmission metal hermetic feed-through tube 434 and a reception metal hermetic feed-through tube 436. A transmission light pipe 438 is optically coupled to a transmission plastic optical fiber (POF) 440 within transmission metal hermetic feed-through tube 434. Similarly, a reception light pipe 442 is optically coupled to a reception plastic optical fiber (POF) 444 within reception metal hermetic feed-through tube 436. Transmission and reception POFs 440 and 444 couple POFSIM 400 to data bus 304. In the exemplary implementation, mating connector 430 includes a plurality of latching mechanisms 450 to facilitate coupling transmission and reception POFs 440 and 444 to POFSIM 400. Optical source 424 is coupled to transmission light pipe 438 such that digital optical signals from optical source 424 are transmitted to data bus 304 through transmission POF 440.

Transmission and reception light pipes 438 and 442 have a relatively high operation temperature, are relatively easy to metalize, and have a diameter and numerical aperture matching the transmission and reception POFs 440 and 444. For example, transmission and reception light pipes 438 and 442 may each be a 1 millimeter (mm) diameter glass rod, a 1 mm diameter hard-clad-silica (HCS) fiber, or a 1 mm diameter multi-core glass fiber. Transmission and reception light pipes 438 and 442 are attached to transmission metal hermetic feed-through tube 434 and reception metal hermetic feed-through tube 436, respectively, by metalizing transmission and reception light pipes 438 and 442, using a high temperature solder reflow process to attach light pipes 438 and 442 to feed-through tubes 434 and 436. This facilitates a high hermeticity (e.g., a Helium leak rate of less than $1 \times 10^{-8}$ cubic centimeters per minute (cc/min)) of POFSIM 400.

Reception light pipe 442 receives one or more digital optical signals from data bus 304 via reception POF 444. A detector 460 coupled to reception light pipe 442 converts the received digital optical signal into an electrical signal. In the exemplary implementation, detector 460 is a high sensitivity silicon detector. Alternatively, detector 460 may be any optical detection device that enables POFSIM 400 to function as described herein.

A receiver circuit 462 coupled to detector 460 converts the electrical signal from detector 460 into a Manchester bi-phase TTL signal, and transmits the TTL signal to TCIEC 412. In the exemplary implementation, receiver circuit 462 is a high sensitivity and high instantaneous dynamic range receiver. A receiver (Rx) BIT circuit 464 is coupled between receiver circuit 462 and TCIEC 412. Upon receiving the TTL signal, TCIEC 412 checks and validates the timing of the received TTL signal, and subsequently sends signal pulses to terminal controller 306. More specifically, signal pulses are output to terminal controller 306 via an RXN and an RXI pin of the plurality of pins 414. Rx BIT circuit 464 monitors a health of a POF cable connection based on a receiver signal strength indicator from the RSSI output from receiver circuit 462. If an error and/or problem is detected, Rx BIT circuit 464 generates and transmits an alert signal to terminal controller 306 through TCIEC 412.

TCIEC 412, Tx BIT circuit 422, laser/LED driver 420, optical source 424, detector 460, receiver circuit 462, and Rx BIT circuit 464 are mounted to a substrate 470 that sinks heat from components of POFSIM 400 to a bottom of package 402. This thermal arrangement reduces a junction temperature rise on components of POFSIM 400 during operation. In the exemplary implementation, substrate 470 is a high thermal conductivity aluminum-nitride substrate. Alternatively, substrate 470 may be any material that enables POFSIM 400 to function as described herein.

Once the components are mounted within package 402 and transmission and reception light pipes 438 and 442 are solder sealed to metal tubes 434 and 436, an out-gassing process is performed on package 402. After the out-gassing process is finished, lid 404 is sealed to package 402 by a high temperature parallel seam welding process to hermetically seal POFSIM 400.

Figure 5:
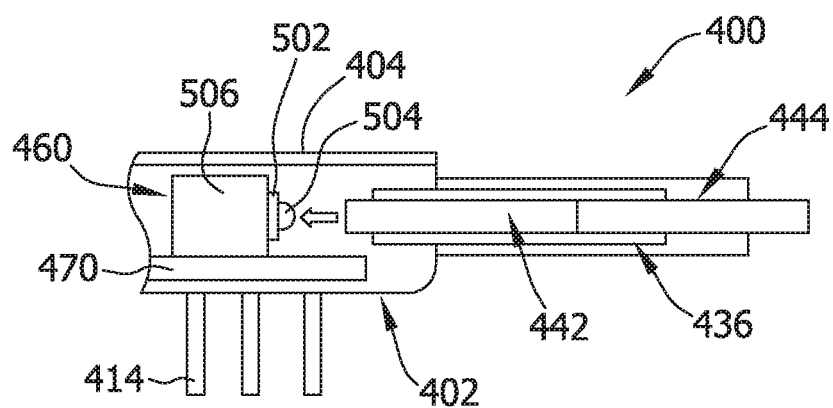
FIG. 5 is a schematic side view of a portion of the POFSIM shown in FIGS. 4A and 4B.

FIG. 5 is a schematic side view of a portion of POFSIM 400. In the implementation shown in FIG. 5, detector 460 includes a high sensitivity detector 502 that is integrated with a ball lens 504. High sensitivity detector 502 and ball lens 504 are mounted on a side of a ceramic submount 506 that is attached to substrate 470. Detector 460 is mounted to substrate 470 at a location which maximizes the optical coupling between reception light pipe 442 and detector 460.

Figure 6:
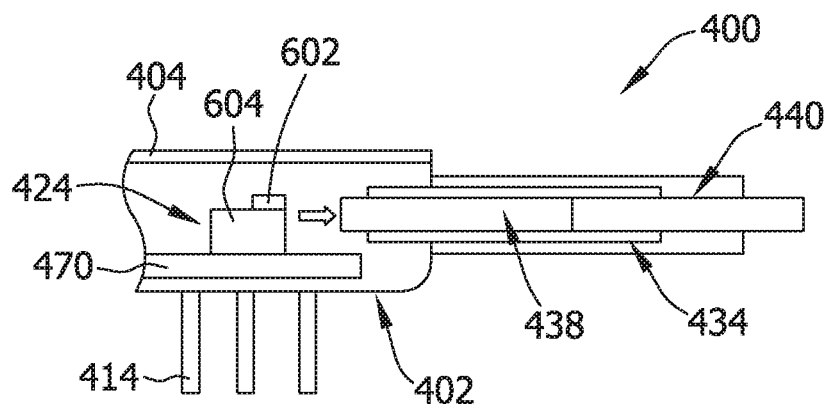
FIG. 6 is a schematic side view of a portion of the POFSIM shown in FIGS. 4A and 4B.

FIG. 6 is a schematic side view of a portion of POFSIM 400. In the implementation shown in FIG. 6, optical source 424 includes an edge-emitting (EE) laser or LED 602 mounted to a top of a high thermal conductivity Kovar (an alloy of copper and tungsten) submount 604. Optical source 424 is mounted to substrate 470 to facilitate maximizing an optical coupling between transmission light pipe 438 and optical source 424. To further increase an output power of optical source 424, a multi-element monolithic (i.e., multi-stripe) laser or EE LED array may be implemented in optical source 424 to increase the optical output power by 3 decibels (dB) or more.

Figure 7:
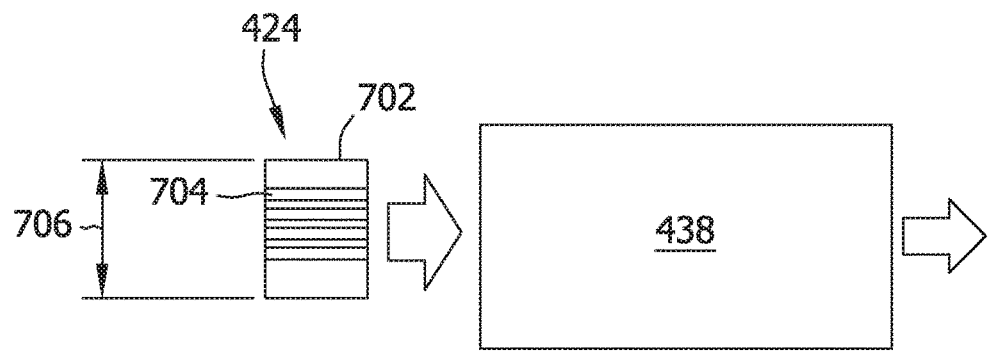
FIG. 7 is a schematic diagram of an optical source that may be used with the POFSIM shown in FIGS. 4A and 4B.

FIG. 7 is a schematic diagram of an implementation of optical source 424 that includes a multi-stripe laser or EE LED array 702 with four elements 704. A width 706 of array 702 is less than 0.5 mm in the exemplary implementation. As transmission light pipe 438 has a 1.0 mm diameter, and array 702 has a width of less than 0.5 mm, a coupling efficiency is approximately the same as for implementations using a single element laser or EE LED. Array 702 may be mounted to submount 604 (shown in FIG. 6).

Figure 8:
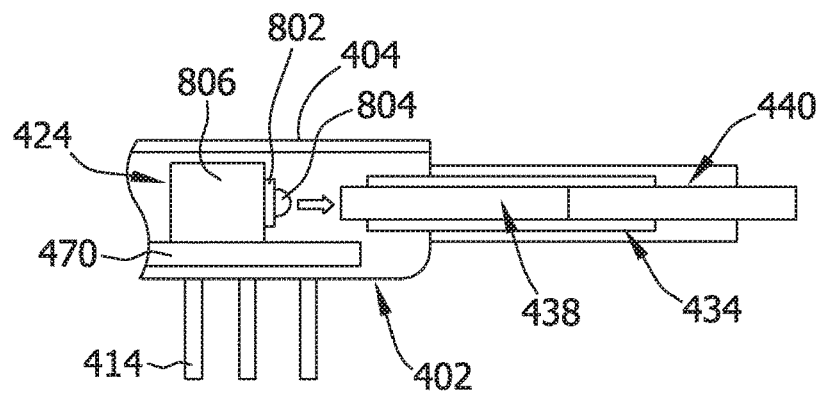
FIG. 8 is a schematic side view of a portion of the POFSIM shown in FIGS. 4A and 4B.

Instead of an EE laser or EE LED, optical source 424 may include a surface-emitting (SE) laser or SE LED. FIG. 8 is a schematic side view of a portion of POFSIM 400. In the implementation shown in FIG. 8, optical source 424 includes a SE vertical cavity surface emitting laser (VCSEL) or SE LED chip 802 with an integrated ball lens 804. Chip 802 and ball lens 804 are mounted on a side of an AlN submount 806 that is attached to substrate 470. AlN submount 806 has a relatively high thermal conductivity for chip 802. AlN submount 806 is mounted to substrate 470 at a location to maximize optical coupling between transmission light pipe 438 and optical source 424.

Figure 9:
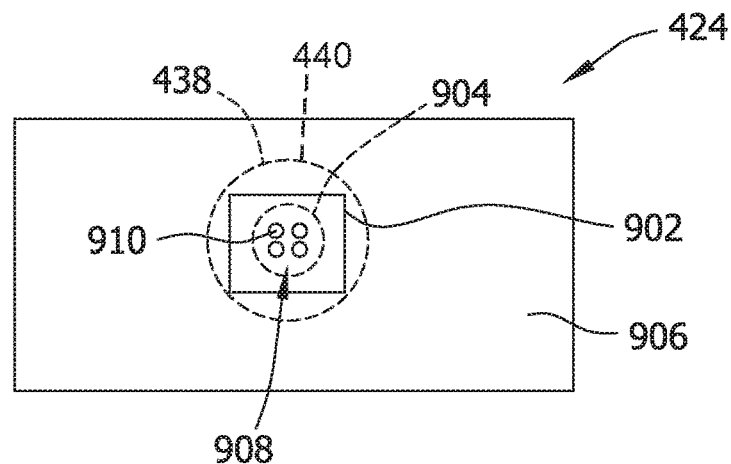
FIG. 9 is a schematic end view of an optical source that may be used with the POFSIM shown in FIGS. 4A and 4B.

To increase optical power, in some implementations, optical source 424 may include an array of VCSEL or SE LED elements. FIG. 9 is a schematic end view of optical source 424. In the implementation shown in FIG. 9, optical source 424 includes a SE vertical cavity surface emitting laser (VCSEL) or SE LED chip 902 with an integrated ball lens 904 having a 0.5 mm diameter. Chip 902 and ball lens 904 are mounted on a side of an AlN submount 906 that is attached to substrate 470 (shown in FIGS. 4A and 4B). Chip 902 includes an array 908 having plurality of VCSEL or SE LED elements 910. In the exemplary implementation, chip 902 includes four elements 910. Alternatively, chip 902 may include any number of elements 910 that enables optical source 424 to function as described herein. As transmission light pipe 438 and transmission POF 440 have a 1.0 mm diameter, which is larger than array 908, an optical output of each element 910 couples into transmission light pipe 438 as efficiently as a single element VCSEL or SE LED source.

Figure 10A:
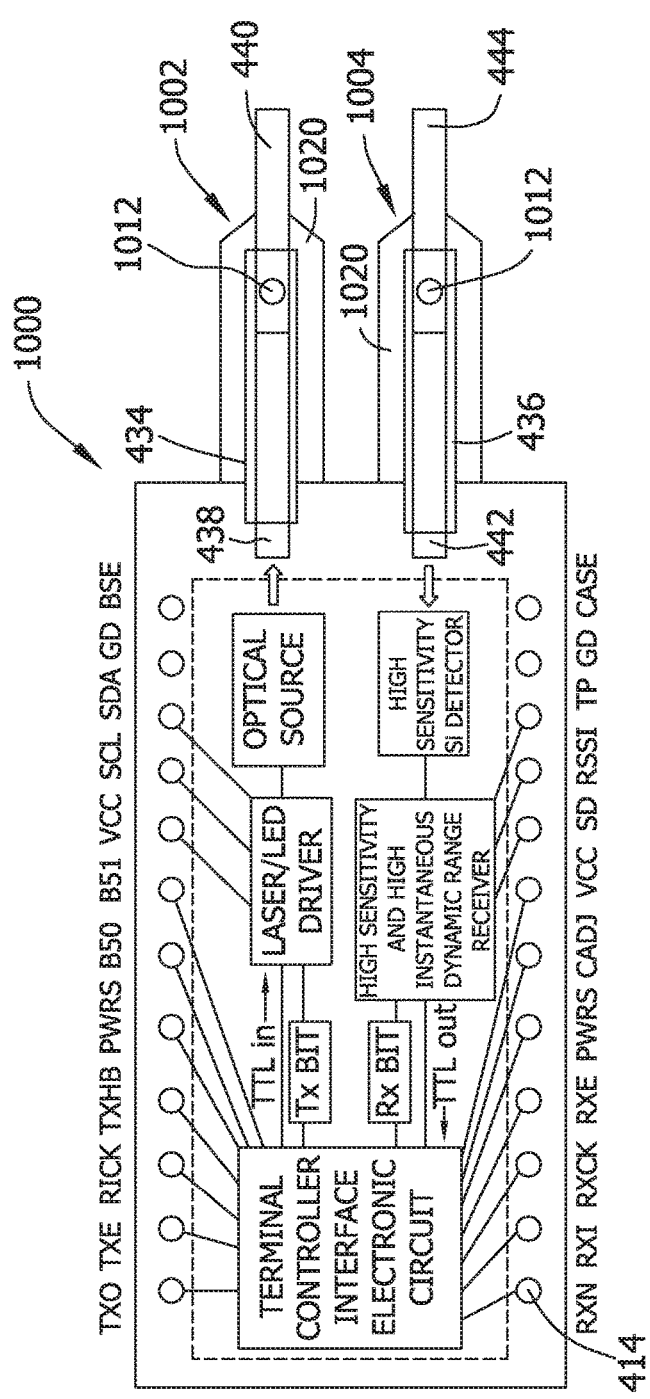
FIG. 10A is a schematic top view of an alternative exemplary POFSIM that may be used with data communication system shown in FIG. 3.
Figure 10B:
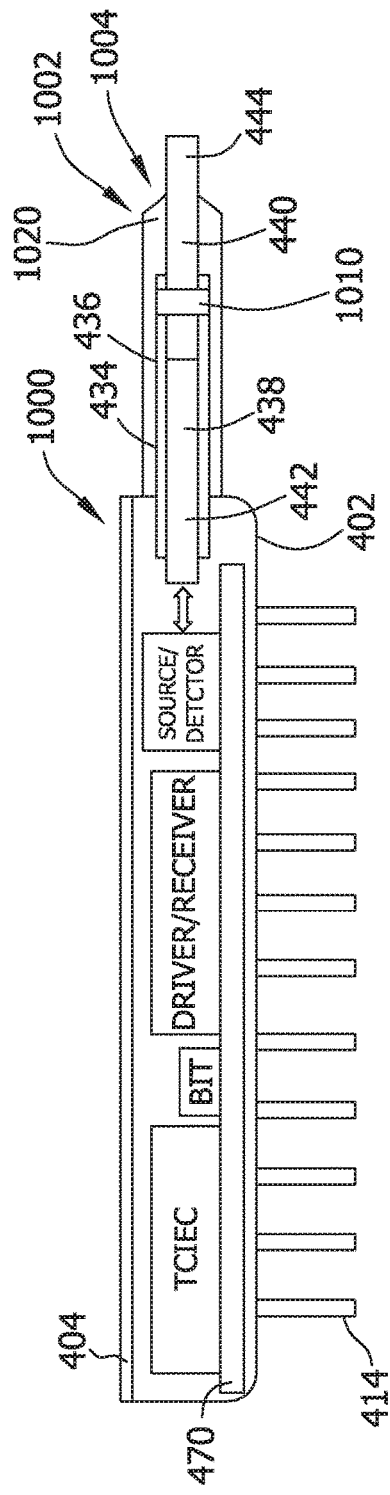
FIG. 10B is a schematic side view of the POFSIM shown in FIG. 10A.

FIG. 10A is a schematic top view of an alternative POFSIM 1000 that may be used with data communication system 300 (shown in FIG. 3). FIG. 10B is a schematic side view of POFSIM 1000. Unless otherwise noted, POFSIM 1000 is substantially similar to POFSIM 400 (shown in FIGS. 4A and 4B). Instead of a mating connector 430 (shown in FIGS. 4A and 4B) for transmission and reception POFs 440 and 444, POFSIM 1000 includes a transmission pigtail 1002 and a reception pigtail 1004 for permanently attached transmission and reception POFs 440 and 444.

More specifically, transmission and reception POFs 440 and 444 are coupled to transmission and reception light pipes 438 and 442. Epoxy 1010 is then supplied to epoxy holes 1012 defined in feed-through tubes 434 and 436. After epoxy 1010 cures, a fiber boot 1020 is slid over each of transmission and reception POFs 440 and 444 and attached to feed-through tubes 434 and 436 by additional epoxy. Boots 1020 prevent POFs 440 and 444 from bending more than a minimum POF bend radius. Boots 1020 also increase the pull strength of POFs 440 and 444 and reduce optical loss due to undesirable bending.

Figure 11A:
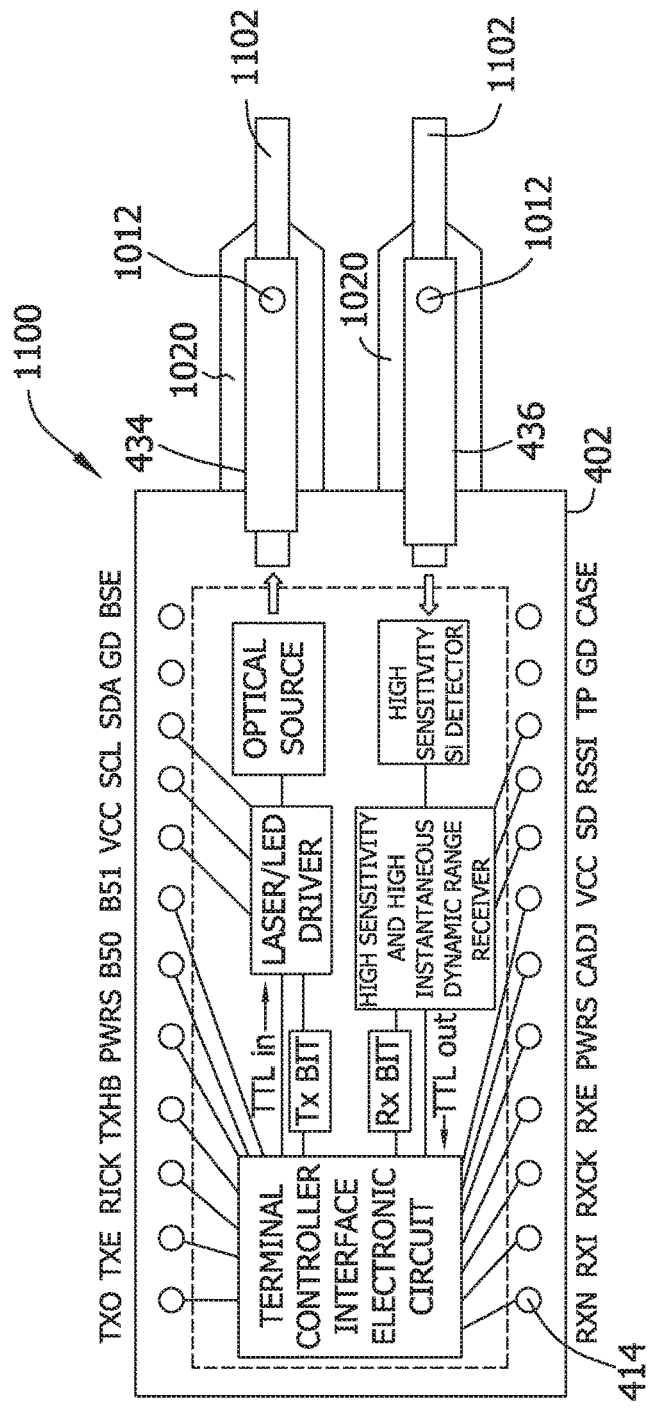
FIG. 11A is a schematic top view of an alternative exemplary POFSIM that may be used with data communication system shown in FIG. 3.
Figure 11B:
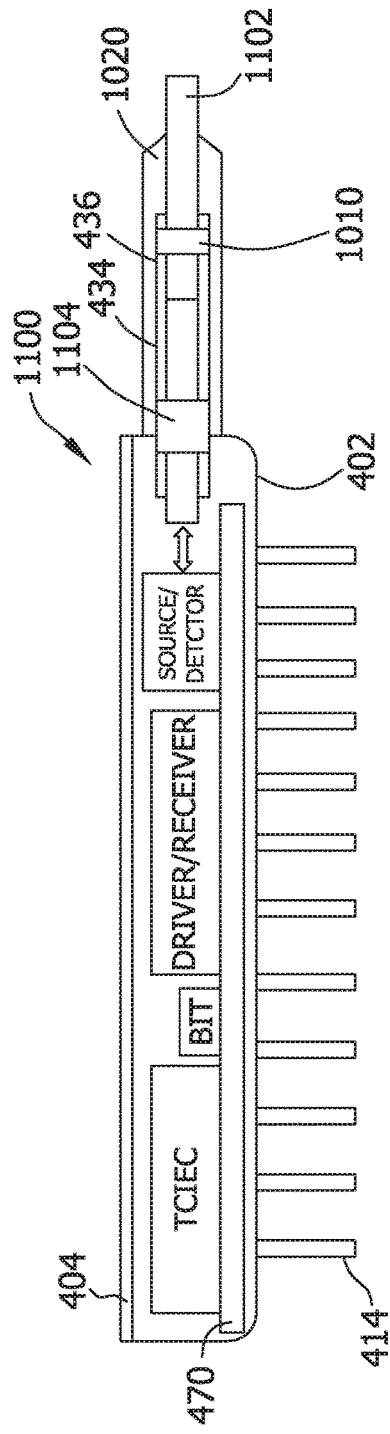
FIG. 11B is a schematic side view of the POFSIM shown in FIG. 11A.

FIG. 11A is a schematic top view of an alternative POFSIM 1100 that may be used with data communication system 300 (shown in FIG. 3). FIG. 11B is a schematic side view of POFSIM 1100. Unless otherwise noted, POFSIM 1100 is substantially similar to POFSIM 1000 (shown in FIGS. 10A and 10B). In POFSIM 1100, light pipes 438 and 442 and POFs 440 and 444 are replaced with POF compatible fibers 1102. POF compatible fibers 1102 may be, for example a hard-clad silica (HCS) fiber or a multi-core glass (MCG) fiber. POF compatible fibers 1102 are coated at a region near package 402, and selected to match the diameter and numerical aperture of a POF. POF compatible fibers 1102 extend beyond feed-through tubes 434 and 436 for coupling to a POF outside POFSIM 1100.

In the exemplary implementation, a solder seal 1104 seals each POF compatible fiber 1102 inside feed-through-tubes 434 and 436. Once the solder seal 1104 is complete, epoxy 1010 is then supplied to epoxy holes 1012 and cured. Fiber boots 1020 are installed onto feed-through tubes 434 and 436, similar to POFSIM 1000.

Figure 12A:
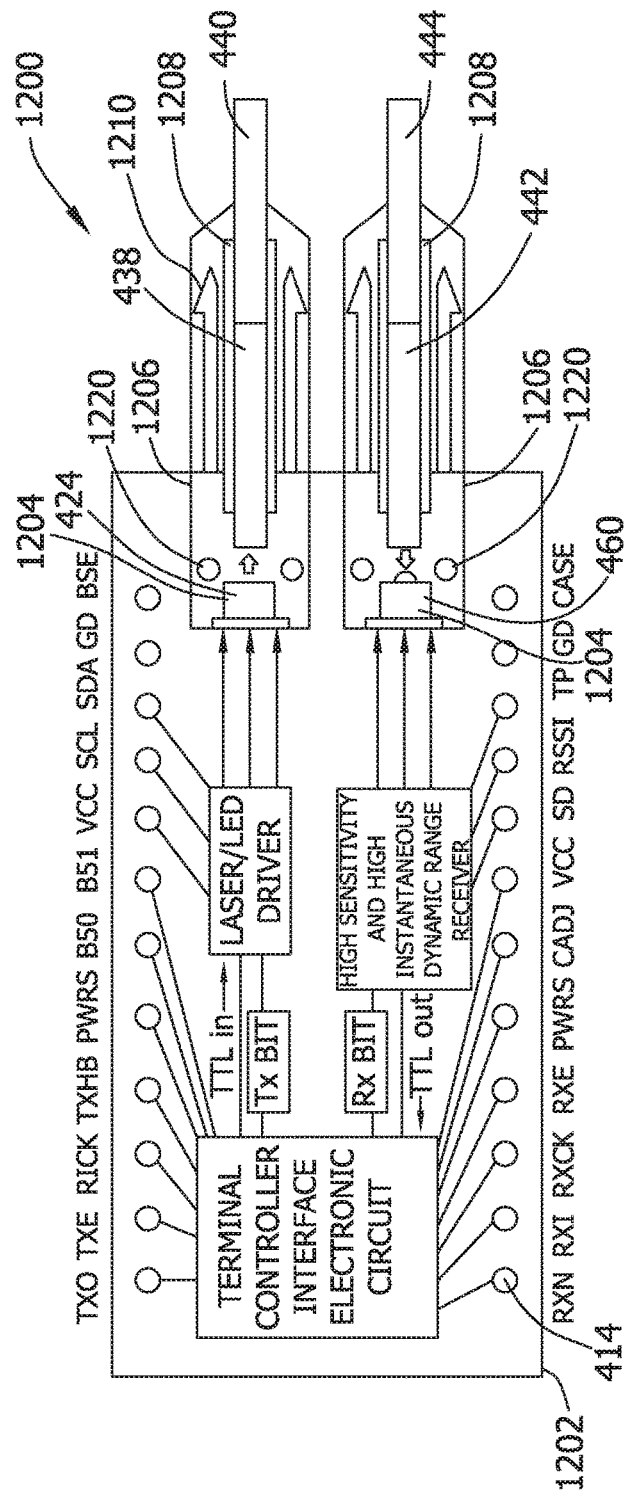
FIG. 12A is a schematic top view of an alternative exemplary POFSIM that may be used with data communication system shown in FIG. 3.
Figure 12B:
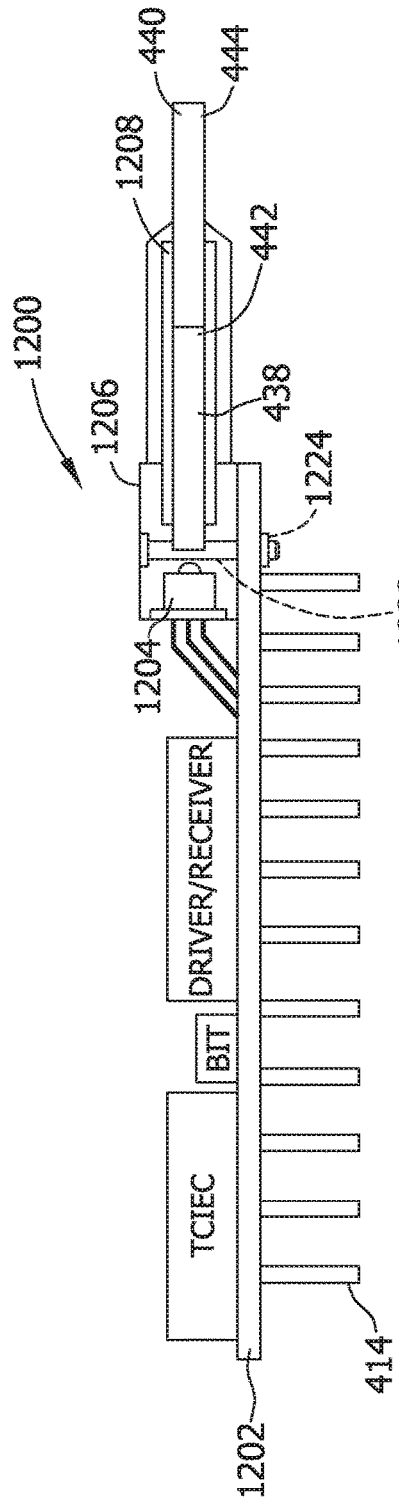
FIG. 12B is a schematic side view of the POFSIM shown in FIG. 12A.

FIG. 12A is a schematic top view of an alternative POFSIM 1200 that may be used with data communication system 300 (shown in FIG. 3). FIG. 10B is a schematic side view of POFSIM 1200. Unless otherwise noted, POFSIM 1200 is substantially similar to POFSIM 400 (shown in FIGS. 4A and 4B). Unlike POFSIM 400, POFSIM 1200 is not hermetically sealed. Accordingly, POFSIM 1200 is utilized in a pressurized area of a vehicle, such as airplane 102 (shown in FIG. 2). Because POFSIM 1200 is not hermetically sealed, it may be less expensive to manufacture POFSIM 1200.

In POFSIM 1200, the components are mounted on a multilayer FR4 printed wire board 1202. Further, optical source 424 and detector 460 are each implemented in transistor outline-can (TO can) packages 1204 that are mounted within respective active optical connectors 1206. Transmission and reception light pipes 438 and 442 are installed in respective alignment sleeves 1208. Each active optical connector 1206 includes external latching mechanisms 1210 to engage transmission and reception POFs 440 and 444. In the exemplary implementation, each active optical connector 1206 includes two through holes 1220 that enable active optical connector 1206 to be mounted to printed wire board 1202 using screws 1222 and nuts 1224. For environmental protection, printed wire board 1202 is coated using a conformal (parylene) coating in the exemplary implementation.

The implementations described herein enable data communications between a terminal controller and a plastic optical fiber data bus. A plastic optical fiber serial interface module (POFSIM) interfaces between the terminal controller and the data bus. The POFSIM receives electrical signals from the terminal controller and transmits corresponding digital optical signals to the data bus. The POFSIM also receives digital optical signals from the data bus, and transmits corresponding electrical signals to the terminal controller.

Unlike at least some known data communication systems, the POFSIM described herein provides a direct interface between a terminal controller and a data bus. Unlike at least some known data communication systems that utilize an optical media converter between a SIM and a data bus, the POFSIM connects directly to the data bus via at least one plastic optical fiber. Accordingly, as compared to at least some known data communication systems, the POFSIM may have a higher power budget (e.g., 6 dB) and a longer useful length (e.g., 50 meters). Moreover, the POFSIM described herein is robust, reliable, light weight, and has a high durability.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A line replacement unit (LRU), comprising:
a terminal controller configured to transmit and receive electrical signals for communication with a POF data bus; and a plastic optical fiber serial interface module (POFSIM) coupled directly to said terminal controller and further coupled to the POF data bus, wherein said POFSIM comprises:
  a mating connector that extends from said POFSIM and comprises a transmit metal hermetic feed-through tube within which a transmit light pipe is mounted, and a receive metal hermetic feed-through tube within which a receive light pipe is mounted, and wherein said POFSIM is configured to:
    transmit digital optical signals based on the electrical signals received from said terminal controller through said transmit light pipe; and
    transmit electrical signals, to said terminal controller, based on digital optical signals received from said receive light pipe;
  a transmit POF coupled to said mating connector and optically coupled, within said transmit metal hermetic feed-through tube, to said transmit light pipe and further optically coupled to the POF data bus; and
  a receive POF coupled to said mating connector and optically coupled, within said receive metal hermetic feed-through tube, to said receive light pipe and further optically coupled to the POF data bus.

2. The LRU of claim 1, wherein said POFSIM comprises an optical source configured to generate digital optical signals to be transmitted to the POF data bus.

3. The LRU of claim 2, wherein said transmit light pipe is optically coupled to said optical source.

4. The LRU of claim 1, wherein said POFSIM comprises a detector configured to receive digital optical signals from the POF data bus.

5. The LRU of claim 1, wherein said POFSIM is hermetically sealed.

6. The LRU of claim 1, wherein the POF data bus is a plastic optical star coupler.

7. The LRU of claim 1, wherein the electrical signals received from said terminal controller are digitally coded.

8. The LRU of claim 7, wherein the electrical signals received from said terminal controller are Manchester bi-phase coded.

9. The LRU of claim 1, wherein the electrical signals transmitted from said POFSIM are digitally coded.

10. A method for communicating with a plastic optical fiber (POF) data bus, said method comprising:
  receiving, at a plastic optical fiber serial interface module (POFSIM) mounted inside a line replacement unit, an electrical signal from the terminal controller, wherein the POFSIM provides a direct interface between the terminal controller and the POF data bus, wherein the POFSIM includes a mating connector having a transmit metal-hermetic feed-through tube within which a transmit light pipe is mounted, the mating connector extending from the POFSIM;
  generating, using the POFSIM, a digital optical signal based on the received electrical signal; and
  transmitting the digital optical signal to the POF data bus from the POFSIM through a transmit POF, the transmit POF configured to be optically coupled, within the transmit metal-hermetic feed-through tube, to the transmit light pipe, and further configured to be optically coupled to the POF data bus.

11. The method of claim 10, wherein generating a digital optical signal comprises:
  receiving a transistor-transistor logic signal at a driver circuit;
  generating a drive current based on the transistor-transistor logic signal;
  transmitting the drive current to an optical source; and
  generating, using the optical source, the digital optical signal based on the drive current.

12. The method of claim 10, wherein generating a digital optical signal comprises generating a digital optical signal using an optical source that comprises at least one of an edge-emitting laser, an edge-emitting light emitting diode, a surface-emitting laser, or a surface-emitting light emitting diode.

13. The method of claim 10, wherein transmitting the digital optical signal to the POF data bus comprises transmitting the digital optical signal to a plastic optical star coupler.

14. The method of claim 10, wherein receiving the electrical signal from the terminal controller comprises receiving a digitally coded signal.

15. The method of claim 10 further comprising receiving a digital optical signal from POF data bus at the POFSIM through a receive POF, the receive POF configured to be optically coupled, within a receive metal-hermetic feed-through tube of the mating connector, with a receive light pipe.

16. The method of claim 15 further comprising transmitting, by the POFSIM, electrical signals to the terminal controller based on the digital optical signal received through the receive light pipe.

17. The method of claim 16, wherein the electrical signals transmitted to the terminal controller are digitally coded.

18. The method of claim 17, wherein the electrical signals transmitted to the terminal controller are Manchester bi-phase coded.

19. The method of claim 15, wherein receiving the digital optical signal at the POFSIM further comprises receiving the digital optical signals at a detector and transmitting a transistor-transistor logic signal to a terminal controller interface electronic circuit (TCIEC) coupled directly to the terminal controller.

20. The LRU of claim 2, wherein the POFSIM further comprises a driver circuit configured to:
  receive the electrical signals from the terminal controller, including a transistor- transistor logic signal;
  generate a drive current based on the transistor-transistor logic signal; and
  transmit the drive current to the optical source;
  wherein the optical source generates the digital optical signal based on the drive current.

* * * * *